United States Patent
Lesau

(10) Patent No.: US 9,444,710 B1
(45) Date of Patent: Sep. 13, 2016

(54) SYSTEM AND METHOD FOR FRAME ALIGNMENT IN HIGH DATA RATE COMMUNICATION SYSTEMS

(71) Applicant: PMC-Sierra US, Inc., Sunnyvale, CA (US)

(72) Inventor: Victor Gusev Lesau, Vancouver (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 159 days.

(21) Appl. No.: 14/086,775

(22) Filed: Nov. 21, 2013

Related U.S. Application Data

(60) Provisional application No. 61/729,256, filed on Nov. 21, 2012.

(51) Int. Cl.
*H04L 12/26* (2006.01)
*H04B 10/27* (2013.01)

(52) U.S. Cl.
CPC ............ *H04L 43/0852* (2013.01); *H04B 10/27* (2013.01)

(58) Field of Classification Search
CPC ... H04L 43/0852; H04L 12/24; H04L 12/46; H04L 12/707; H04L 12/891; H04L 1/22; H04B 10/27; H04B 10/05; H04B 10/2575
USPC ........................................................ 370/476
See application file for complete search history.

(56) References Cited

U.S. PATENT DOCUMENTS

| | | | | |
|---|---|---|---|---|
| 7,991,296 | B1 * | 8/2011 | Johnston et al. | 398/154 |
| 2008/0095197 | A1 * | 4/2008 | Boduch | H04B 10/1149 370/516 |
| 2013/0148520 | A1 * | 6/2013 | Das | H04J 13/0077 370/252 |
| 2014/0032832 | A1 * | 1/2014 | Asamoto | H04L 45/7457 711/108 |

OTHER PUBLICATIONS

Guindani et al., "A 10 Gbps OTN Framer Implementation Targeting FPGA Devices", from Dec. 9, 2009 International Conference on Reconfigurable Computing and FPGAs in Cancun, Mexico, downloaded on Jan. 21, 2010 from http://ieeexplore.ieee.org/, 6 pages.
International Telecommunication Union (ITU), "Interfaces for the optical transport network", ITU Recommendation ITU-T G.709/Y. 1331, (Feb. 2012), printed in Geneva, Switzerland, 2012, 238 pages.
International Telecommunication Union (ITU), "Characteristics of optical transport network hierarchy equipment functional blocks", ITU-T G.798 (Dec. 2012) Pre-published version, 397 pages.

* cited by examiner

*Primary Examiner* — Mohammad Anwar
*Assistant Examiner* — Kokou R Detse
(74) *Attorney, Agent, or Firm* — Dennis R. Haszko

(57) ABSTRACT

An apparatus and method for scalable frame alignment in a high data-rate communications system. OTUk/ODUk frame alignment uses serial processing of a match vector, or serial processing of received OTUk/ODUk bytes to reduce the footprint occupied by the processing logic.

48 Claims, 15 Drawing Sheets

Figure 1
PRIOR ART

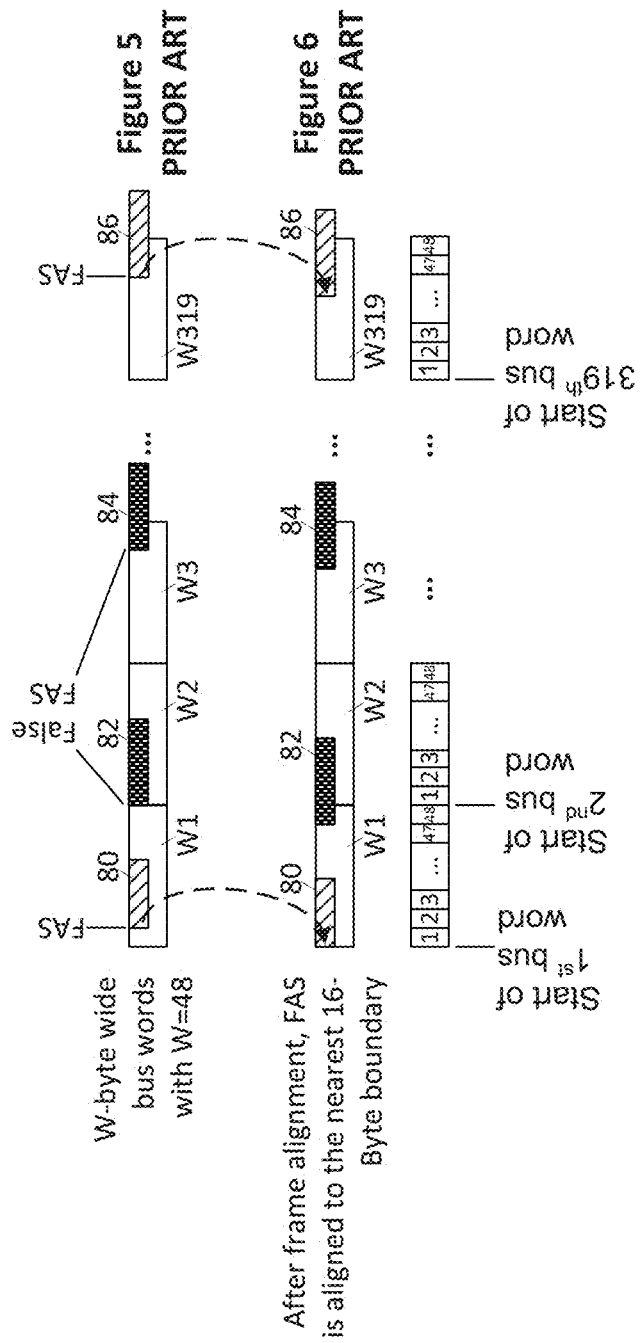

SYSTEM AND METHOD FOR FRAME ALIGNMENT IN HIGH DATA RATE COMMUNICATION SYSTEMS

CROSS REFERENCE TO RELATED APPLICATIONS

This application claims the benefit of priority of U.S. Provisional Patent Application No. 61/729,256, filed Nov. 21, 2012, which is incorporated herein by reference in its entirety.

FIELD

The present disclosure relates generally to the field of data communication protocols and transport networks. In particular, the present disclosure relates to optical transport networks (OTNs) and to the alignment of digital, framed signals within OTNs.

BACKGROUND

The International Telecommunication Union (ITU) sets forth recommendations for interfaces in optical networks in ITU-T Recommendation G.709. This recommendation defines, amongst others, an optical channel data unit (ODUk), an optical channel payload unit (OPUk), and an optical channel transport unit (OTUk). The containment relationship between the ODUk, the OPUk, and the OTUk is well-known and can be summarized as follows: The OTUk comprises the ODUk, which comprises the OPUk, which comprises client frames.

An ODUk frame consists of 4 rows and 3824 columns. An OTUk frame consists of 4 rows and 4080 columns. The first 16 columns of an OTUk frame and of an ODUk frame include a header, and the remaining columns are dedicated to payload. The first 6 bytes of the first row are dedicated to a Frame Alignment Signal (FAS), which is used for delineating OTUk/ODUk frames. The seventh byte represents the Multi-Frame Alignment Signal (MFAS), which is used for indicating the sequence number of an OTUk/ODUk frame out of 256 frames. For the purpose of the present disclosure, an OTUk/ODUk frame can be referred to simply as an OTN frame.

The FAS is defined in the first row of the OTUk/ODUk, at columns 1 to 6, as the following series of OA1 and OA2 bytes: OA1-OA1-OA1-OA2-OA2-OA2; the OA1 byte corresponds to 11110110 and the OA2 byte corresponds to 00101000. The MFAS is at the seventh column of the first row and is simply a binary number comprised between 0 and 255.

According to ITU-T Recommendation G.798—Characteristics of OTN hierarchy equipment functional blocks, the OTUk frame alignment is to be found by searching for the OA1 and OA2 FAS bytes and, the multiframe alignment is to be found based on the MFAS byte comprised in the OTUk frame.

With respect to OTUk frame and multiframe alignment, in the out-of-frame (OOF) state, the framing pattern searched is to be a four-byte subset of the OA1 and OA2 bytes. With respect to OTUk frames, in the context of the present disclosure, the FAS can be said to have four bytes. The in-frame (IF) state is to be entered if this subset is found and confirmed one frame period later. In the IF state, the frame signal is to be continuously checked, with the presumed frame start position, for correct alignment. The framing pattern checked for is the OA1OA2OA2 pattern (bytes 3, 4 and 5 of the first row of the OTUk frame). The OOF state is to be entered if this subset is not found at the correct position in 5 consecutive frames. The frame start shall be maintained during the OOF state.

The OTUk multiframe alignment is to be found based on the MFAS byte contained in the OTUk frame (row 1, column 7 of the OTUk frame). The out-of-multiframe (OOM) state is to be assumed when the received MFAS does not match with the expected multiframe number in 5 consecutive OTUk frames. In the OOM state, multiframe alignment shall be assumed to be recovered, and the in-multiframe (IM) state shall be entered, when, in two consecutive OTUk frames, an error-free MFAS sequence is found. The multiframe start position is to be maintained during the OOM state.

Figure 1:
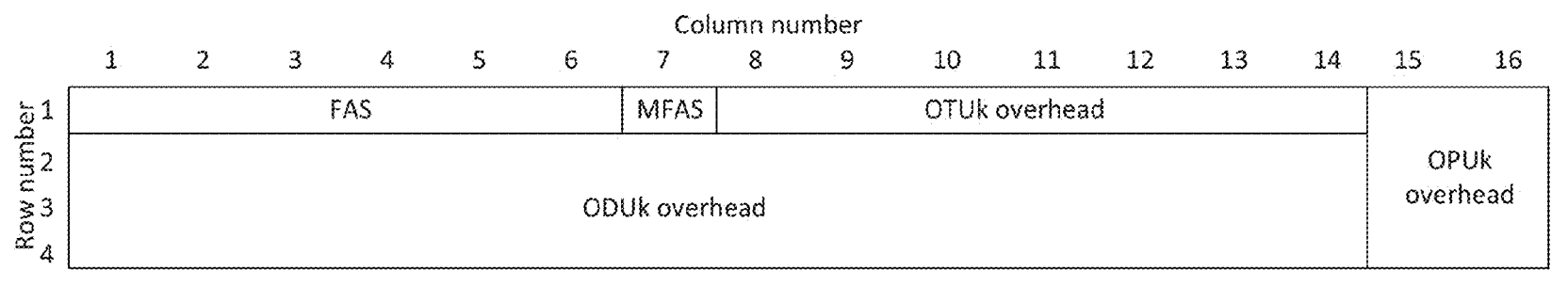

FIG. 1 shows the first sixteen columns and the four rows of an OTUk/ODUk frame, and the position, within the OTUk/ODUk frame, of the FAS, MFAS, OTUk overhead, ODUk overhead, and OPUk overhead.

With respect to ODUk frame alignment, in the OOF state, the framing pattern searched for is to be the full set of the six OA1 and OA2 bytes. The IF state shall be entered if this set is found and confirmed one frame period later and an error free multiframe sequence is found in the MFAS bytes of the two frames.

In the IF state, the frame alignment signal is to be continuously checked with the presumed frame start position and the expected multiframe sequence. The framing pattern checked for is to be the OA1OA2 pattern (bytes 3 and 4 of the first row of the ODUk frame). The OOF state is to be entered if this subset is not found at the correct position in 5 consecutive frames or the received MFAS does not match with the expected multiframe number in 5 consecutive frames.

ITU-T Recommendation G.709 defines a number of ODUk frames, where the order k can be any one of 0, 1, 2, 3, and 4, which correspond to increasing bit rates. A lower rate ODUk can be multiplexed into a higher rate ODUk, thereby, enabling multilevel multiplexing, which allows higher rate clients to carry lower rate clients over the same optical fiber.

The ODUk frame alignment procedure is defined in ITU-T Recommendation G.798. It refers to a receive path, i.e., a sink, and allows for locking to the start of the frame and multiframe, and also allows for extracting overhead and payload from predefined locations. An example of an ODUk sink is shown in FIG. 2. In this example, a high order (HO) client signal, for example, an ODU4 signal 50, is received at a demultiplexer 52 and is demultiplexed into medium order (MO) signals, for example 10 ODU2 signals 54, which are frame aligned by an alignment module 56. The frame alignment module 56 outputs 10 frame-aligned ODU2 signals 58 that can be input into a demultiplexer 60, which demultiplexes the 10 frame-aligned ODU2 signals 58 into low order signals 62, for example, 40 ODU1 signals 62. These 40 ODU1 signals 62 can be frame aligned by a frame alignment module 64, which outputs 40 frame aligned ODU1 signals 66.

As is known in the art, subsequent the demultiplexing of the ODU4 signal 50 by the demultiplexer 52, the 10 ODU2 signals 54, which are medium order signals, need to be frame aligned in order to be able to extract the overhead and payload from each frame. Similarly, subsequent the demultiplexing of the 10 ODU2 signals 58 by the demultiplexer 60, the 40 ODU1 signals 62, which are low order signals, need to be frame aligned in order to be able to extract the overhead and payload from each frame.

In the example of FIG. 2, the ODU4 signal 50 does not need frame alignment because its frame is assumed to be already byte and frame aligned to the OTUk frame. When an upstream block aligns to the OTUk frame, so does the ODUk frame boundary.

FIG. 3 shows another example of where frame alignment may be used. In FIG. 3, LO client signals 68 arriving from an external interface such as, for example, the system fabric 70, need to be frame-aligned, by a frame alignment module 72, before any processing can be performed on the overhead and payload of the frame-aligned client signals 74.

Frame and multiframe alignment is necessary to OTUk/ODUk sink functionality according to ITU-T Recommendation G.798. Modern transport networks require traffic rates in the order of 100 Gbps. The future promises the need for even higher rates of 400 Gbps, 1 Tbps and beyond. Such increases will require that the processor chip architectures to adapt accordingly. A brute force approach described further below leads to a linear increase in logic size, which will negatively impact the size of the hardware required to carry out operations on increasingly high rate signals.

The importance of an efficient frame and multiframe alignment implementation is further emphasized in multi-stage and multichannel architectures, such as the one shown in the examples of FIG. 2 and FIG. 3. There are multiple points in the architecture where such frame alignment logic is required, thereby further adding up to the number of gates required.

Future, smaller technology node steps promise higher integration with minor improvements in operating frequencies. Thus, devices supporting higher rate clients will likely scale their bus size. For example, a 100 Gbps device with 384-bit wide bus could scale to 3840 bits to support 1 Tbps clients.

In a typical brute force FAS matching approach for a W-byte wide bus, W being an integer, a frame alignment system can be implemented using W×6B matchers, where the 6 bytes (Bs) represent the pattern consisting of OA1 and OA2 bytes of the FAS, as specified in the ITU-T Recommendation G.798.

FIG. 4 shows a block diagram of a framing device that includes 6B matchers 76 combinationally comparing 6 bytes of a W-byte word with the FAS pattern. Each of the 6B matchers 76 outputs a single bit match flag. Assuming a byte-aligned data bus, Wx6B matcher instances are required as the FAS pattern can be found anywhere in the currently processed bus word. As a result, the output of the 6B matchers 76 defines a W-bit wide match vector that has a logic 1 at locations where the FAS pattern has been found and a logic 0 at locations where the FAS pattern was not found.

After the match vector is determined, the next step in the brute force approach of frame alignment is to search the match vector for the first detected occurrence of the FAS pattern. This is performed by a location find device 78. The output of the search of the match vector is a pointer to the location of the first detected occurrence of the FAS pattern, within the bus word. Depending on the design frequency and technology node, more than one stage of registers may be required in order to meet timing requirements. FIG. 4 shows this as two separate stages (stage 1 and stage 2) where the output of the matchers (the output of the matchers defines the match vector) is registered prior to performing a location find operation. Registers are present at the dashed line separating stage 2 from stage 1.

In the location find device 78, each bit of the match vector is processed in parallel with the other bits. Consequently, the frame alignment logic in the example of FIG. 4 is proportional to the size of the bus width. It would be beneficial to be able to increase the width of the bus without having to proportionally increase the size of the location find device 78. Further, when scaling with this approach from 100 Gbps to 1 Tbps, the number of 6B matchers, and thereby the logic, linearly increases by a factor of 10. Therefore, increasing signal rates negatively impacts the dimensional constraints of the physical logic required for frame alignment.

Therefore, improvements in frame alignment are desirable.

SUMMARY

It is an object of the present disclosure to obviate or mitigate at least one disadvantage of previous.

In a first aspect, the present disclosure provides a method of aligning a series of bytes comprising a plurality of instances of a pre-determined sequence of N consecutive alignment bytes, N being an integer number, the pre-determined sequence of N consecutive alignment bytes being a frame alignment signal (FAS). The method comprises: comparing the series of bytes to the FAS to identify locations of FASs within the series of bytes; generating a match vector in accordance with the locations of the FASs, the match vector having components indicative of the location of an FAS match, the components having a FAS match value; dividing the match vector into sections; searching, in the sections, in one section at a time, for a first instance of an FAS match value; determining, in accordance with a pre-determined frame length and in accordance with a position of the first instance of the FAS match value within the match vector, a location of a next expected instance of the FAS; and verifying that the location of the next expected instance of the FAS match value has an FAS match value.

In a second aspect, the present disclosure provides a method of aligning a series of bytes comprising a plurality of instances of a pre-determined sequence of N consecutive alignment bytes, N being an integer number, the pre-determined sequence of N consecutive alignment bytes being a frame alignment signal (FAS). The method comprises: dividing the series of bytes into multiple groups of bytes, each group having a number of words NW, each group of bytes having a total number of bytes equal to, or greater than, a predetermined frame length; dividing each word into blocks; starting at a first block of a first word, comparing, sequentially for each word, the consecutive sequences of N bytes of the first block with the FAS; when a match is not found between any sequence of N bytes and the FAS, iteratively performing the following action: A. starting at a start block of a first word of the subsequent group of bytes, comparing, sequentially for each word, the consecutive sequences of N bytes of the start block with the FAS, each start block being located NW words and one block away from a respective first block when performing action A for the first time, or from a respective previous start block when performing action A for the second time or more; when the match is found between a sequence of N bytes and the FAS, comparing another sequence of N bytes located one pre-determined frame length away from the sequence of N bytes that matches the FAS with the FAS to confirm that the other sequence of N bytes also matches with the FAS.

In a third aspect, the present disclosure provides a method of aligning a series of bytes comprising a plurality of instances of a pre-determined sequence of N consecutive alignment bytes, N being an integer number, the pre-determined sequence of N consecutive alignment bytes being a frame alignment signal (FAS), the method comprising: dividing the series of bytes in a number of words NW; dividing each word into blocks; starting at a first block of a start word, comparing, sequentially for each block of each word, until a match is found between a sequence of N bytes of the byte segment and the FAS, the consecutive sequences of N bytes of the block with the FAS; and when the match is found between a sequence of N bytes and the FAS, comparing another sequence of N bytes located one pre-determined frame length away from the sequence of N bytes that matches the FAS with the FAS to confirm that the other sequence of N bytes also matches with the FAS.

In a fourth aspect, the present disclosure provides a method of aligning a series of bytes comprising a plurality of instances of a pre-determined sequence of N consecutive alignment bytes, N being an integer number, the pre-determined sequence of N consecutive alignment bytes being a frame alignment signal (FAS). The method comprises: dividing the series of bytes into multiple groups of bytes, each group having a number of words NW, each word having a word length, a pre-determined frame length not being an integer multiple of the word length; dividing each word into blocks, each block having a number of bytes NB, a total number of bytes in each word being an integer multiple of NB, the total number of bytes NB in each block having a plurality of consecutive sequences of N bytes; comparing, for a first block of each word of a first group of bytes, the consecutive sequences of N bytes of the first block with the FAS; when a match is not found between any sequence of N bytes and the FAS, iteratively performing the following action until a match is found between a sequence of N bytes of the byte segment and the FAS: for each word of the subsequent group of bytes, comparing, for each of the first blocks, the consecutive sequences of N bytes of each the first block with the FAS; when the match is found between a sequence of N bytes and the FAS, comparing another sequence of N bytes located one pre-determined frame length away from the sequence of N bytes that matches the FAS with the FAS to confirm that the other sequence of N bytes also matches with the FAS.

In a fifth aspect, the present disclosure provides a system for aligning a series of bytes comprising a plurality of instances of a pre-determined sequence of N consecutive alignment bytes, N being an integer number, the pre-determined sequence of N consecutive alignment bytes being a frame alignment signal (FAS). The system comprises: a search module to search for instances of the pre-determined sequence of N consecutive alignment bytes, within the series of bytes, by comparing the series of bytes to the FAS, to identify locations of FASs within the series of bytes, the search module also to generate a match vector in accordance with the locations of the FASs, the match vector having components indicative of the location of an FAS match, the components having a FAS match value; a memory to store the match vector; a location find module to retrieve, sequentially, from the memory, sections of the match vector to search the sections for FAS matches and to identify a position of a first instance of an FAS match value, the location find module also to store, in the memory, the position of the first instance of an FAS match value; a location compare module to retrieve, from the memory the position of the first instance of an FAS match value and to determine, in accordance with a pre-determined frame length and in accordance with a position of the first instance of the FAS match value, a location of a next expected instance of the FAS; an extraction module to extract a byte sequence from the location of the next expected instance of the FAS, as determined by the location compare module; and, a confirm module to compare the extracted byte with the FAS and to indicate a FAS match or no FAS match.

In a sixth aspect, the present disclosure provides a system for aligning a series of bytes comprising a plurality of instances of a pre-determined sequence of N consecutive alignment bytes, N being an integer number, the pre-determined sequence of N consecutive alignment bytes being a frame alignment signal (FAS). The system comprises: a search module to search for instances of the pre-determined sequence of N consecutive alignment bytes, within the series of bytes, by comparing the series of bytes to the FAS, to identify locations of FASs within the series of bytes, the search module also to generate a match vector in accordance with the locations of the FASs, the match vector having components indicative of the location of an FAS match, the components having a FAS match value; a first register serially connected to the search module, the register to store the match vector; a location find module serially connected to the first register; a second register serially connected to the location find module, the location find module to retrieve, from the first register, sections of the match vector to search the sections for FAS matches and to identify a position of a first instance of an FAS match value, the location find module also to store, in the second register, the position of the first instance of an FAS match value; a location compare module to retrieve, from the second register, the position of the first instance of an FAS match value and to determine, in accordance with a pre-determined frame length and in accordance with a position of the first instance of the FAS match value, a location of a next expected instance of the FAS; an extraction module to extract a FAS from the incoming data stream at an expected FAS location; a third register serially connected to the extraction module, the register to store the byte sequence extracted by the extraction module; a confirm module serially connected to the third register, the confirm module to compare the extracted byte with the FAS and to indicate a FAS match or no FAS match; and a frame offset module connected at an input of the extraction module and at the input of the search module, the frame offset module to adjust the location at which to search for a FAS, within a data word, after a movement of an FAS location within the data word from one frame to the next due to non-integer division of a frame length by the number of bytes per word.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 1 shows the first sixteen columns and the four rows of an ODUk frame.

FIG. 5 shows a series of FAS bytes.

FIG. 6 shows a series of aligned FAS bytes.

DETAILED DESCRIPTION

Figure 2:
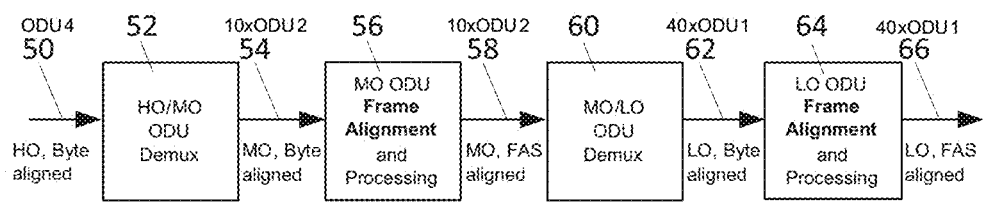
FIG. 2 shows an example of an ODUk sink.
Figure 3:
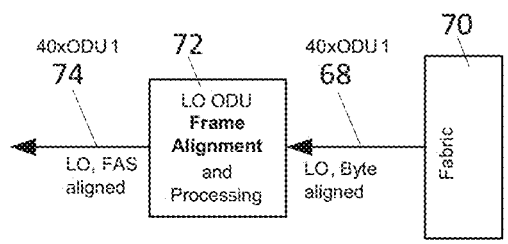
FIG. 3 shows an example of where frame alignment may be used.

The present disclosure provides a method and apparatus that allows for a more scalable implementation of frame alignment approaches, which show an increased efficiency with the increase in the transport rate.

Even though the present disclosure describes FAS pattern searching through examples that use a byte-aligned bus, the present disclosure also applies to bit-alignment and to other types of alignments such as, for example, alignments to groups of bits having more than one bit, which results in a proportional increase in the number of possible alignments (for example, bit vs. byte alignment for a 100 Gbps device requires 8× more matching elements using a brute force approach). Thus, both the increase of device rate and decrease in alignment granularity impact the size of digital logic required for implementing the alignment.

The present disclosure provides a system and method for OTUk/ODUk frame alignment. In an embodiment, the present disclosure provides an architecture for OTUk/ODUk frame alignment adapted to process aggregate throughputs of, for example, 100 Gbps and above. It is, however, equally applicable to lower data rates. The performance of the framer can scale with an increasing bus width, FAS pattern alignment granularity of a high-bitrate network device, or both, without proportionally scaling the physical area and power consumption of the framer.

FIG. 5 shows a series of FAS bytes (80, 82, 84, 86) located in W-byte wide bus words (W1, W2, W3, . . . , W319) prior to the first instance of the FAS 80 being aligned to a target location. FIG. 6 shows the series of FAS bytes (80, 82, 84, 86) located in the W-byte wide bus words (W1, W2, W3, . . . , W319) after the alignment of the first instance of the FAS 80 to a target location. The series of bytes at reference numerals 82 and 84 form, by coincidence, FASs, which can be termed as false FASs or FAS mimics. These FAS mimics can be discarded after the first FAS 80 is identified. In the examples of FIGS. 5 and 6, the device data bus width is W=48 bytes. As the ODUk frame length (3824 bytes*4=15296 bytes) is not a multiple of W (15296/48=318 and ⅔), the FAS/MFAS patterns move with respect to the data bus byte position from frame to frame. The purpose of the frame alignment is to find and lock to the correct FAS/MFAS signals, track their location and realign FAS/MFAS to the nearest target location. In the example of FIGS. 5 and 6, the target locations are at bytes 0, 16 and 32. A bus can encode these locations using a 2-bit control signal, with the fourth state encoding NO_FAS. With respect to OTUk frames, they have a frame length of 4080 bytes*4=16320 bytes.

Such alignment/realignment reduces processing overhead for processing components disposed downstream from the alignment components. Note that in this example, it is assumed that the FAS/MFAS have already aligned to the nearest byte by an upstream component. However, with the method and apparatus proposed in this disclosure it is possible to easily extend the logic to process a non-byte aligned data stream. Finally, in FIG. 5, the 7-byte FAS/MFAS pattern can start from any one of the 48 bytes in a given W-byte wide word. Therefore, it is essential to search the pattern at all locations.

Figure 7:
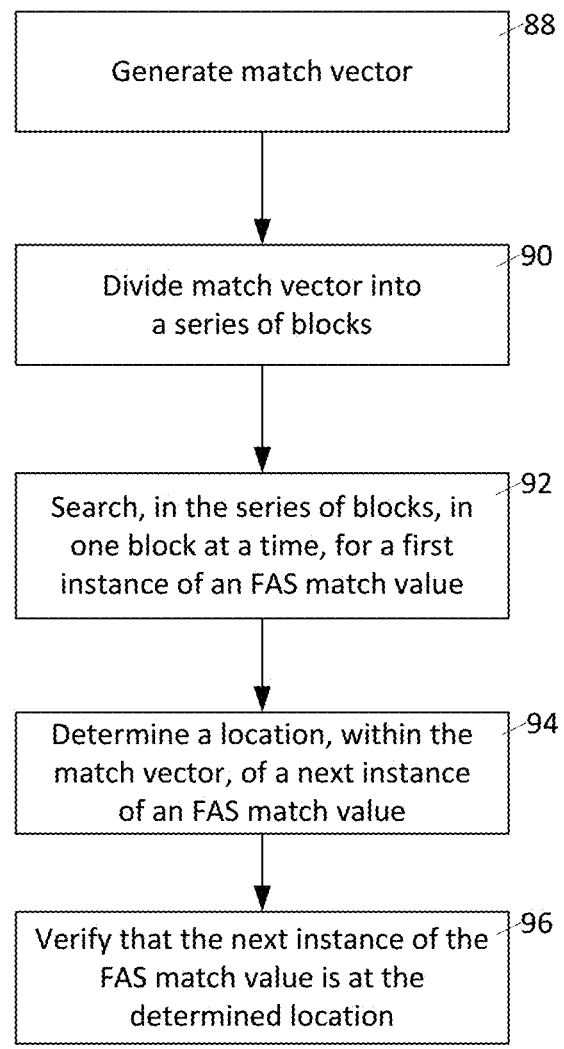
FIG. 7 shows a flowchart of a method according to an embodiment of the present disclosure.

FIG. 7 shows a flowchart of a method according to an embodiment of the present disclosure. In this embodiment, a match vector is processed sequentially in blocks rather than all at once; i.e., rather than all the bits of the match vector being processed in parallel.

Figure 4:
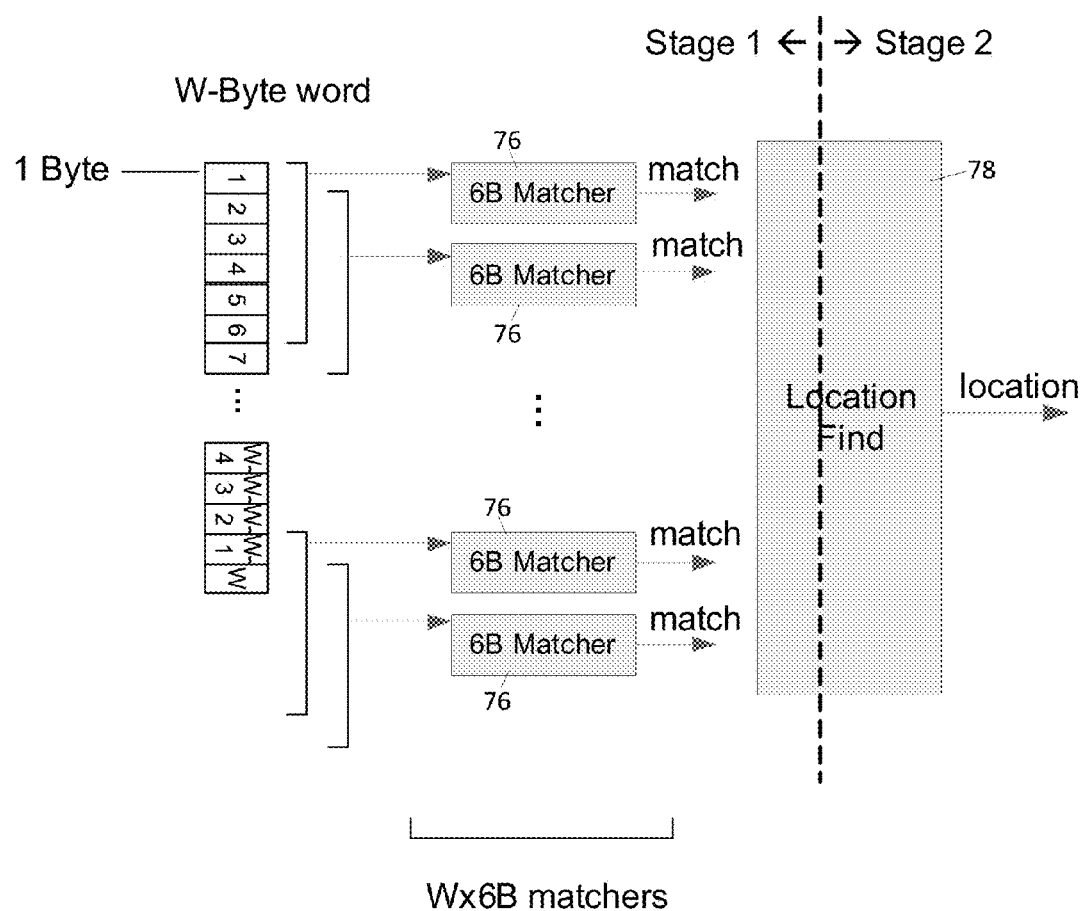
FIG. 4 shows a block diagram of a framing device.

At action 88 of FIG. 7, a match vector is generated. For example, the match vector can be generated by combinationally comparing each consecutive sequence of 6 bytes of a W-byte word with the FAS pattern. This is can be effected by using, as shown in FIG. 4, 6B matchers 76 that each output a single bit match flag. Assuming a byte-aligned data bus, W×6B matcher instances are required as the FAS pattern can be found anywhere in the currently processed bus word. As a result, the output of the 6B matchers 76 defines a W-bit wide match vector that has logic 1 at locations where the FAS pattern has been found and 0 at locations where the FAS pattern was not found.

With respect to FIG. 4, the W-Byte word is shown having bytes 1 to W. As such, the W bytes of the word define multiple sequences of 6 bytes. For example: sequence 1 comprises bytes 1 to 6, sequence 2 comprises bytes 2 to 7, sequence 3 comprises bytes 3 to 8, etc. Therefore, any two consecutives sequences of N consecutive bytes in a W-byte word (or portion thereof) are offset by one byte.

Referring back to FIG. 7, at action 90, the match vector is divided in a series of block where the blocks are to be searched sequentially, one a time, in order to find instances of the FAS. The search of each block is carried out at action 92. Responsive to having found a first instance of the FAS and the location of the first instance of the FAS, action 94 determines a location, within the match vector, of the next instance of the FAS. The determination carried out by action 94 is effected by using the knowledge of the location of the first instance of the FAS and the knowledge of the frame length.

At action 96, verification that the next instance of the FAS is indeed where it ought to be is carried out.

Figure 8:
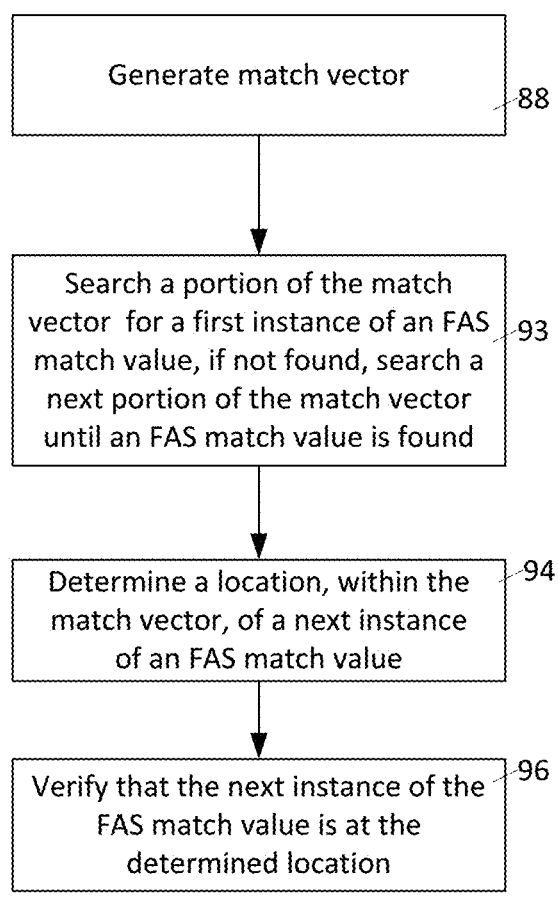
FIG. 8 shows a flowchart of a method according to another embodiment of present disclosure.

FIG. 8 shows a flowchart of a method according to another embodiment of present disclosure. FIG. 8 is similar to FIG. 7 except that the action 90 of FIG. 7 (dividing match vector into a series of blocks) is omitted and the action 92 of FIG. 7 (search, in the series of blocks, in one block at a time, for a first instance of an FAS match value) is replaced with an action 93 where a search for a first instance of an FAS match value is conducted in a portion of the match vector and is iteratively repeated in a next portion of the match vector, and then subsequently in following portions of the FAS, until an FAS match value is found. Each portion of the match vector can have a same bit length, which is smaller than the bit length of the match vector.

Figure 9:
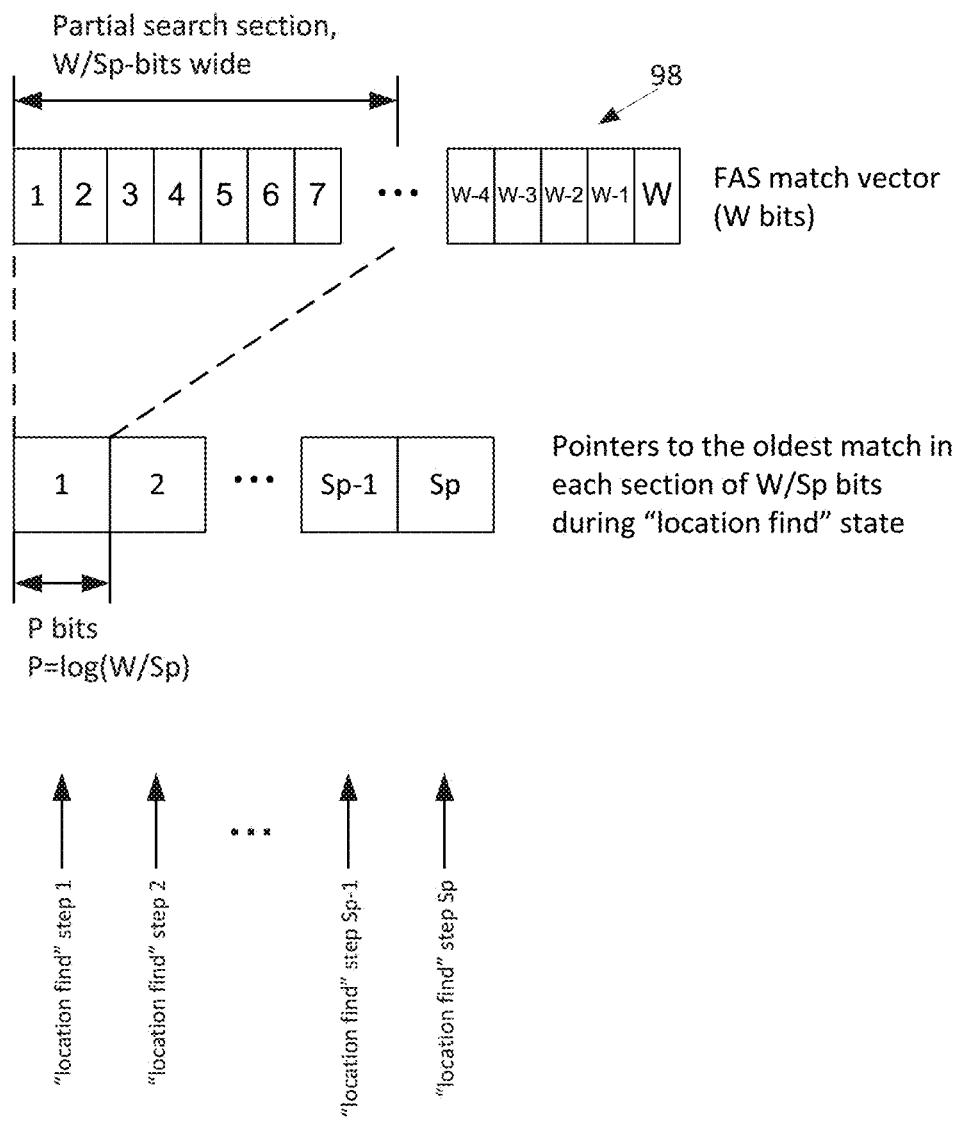
FIG. 9 shows an example of how a match vector having W bits is divided into a number of sections.

FIG. 9 shows how a match vector having W bits is divided into a number, Sp, of sections that are searched one at a time for an FAS match. That is, FIG. 9 shows the process of splitting or dividing each bus word into Sp number sections of bits in order to search for a first FAS match.

Figure 10:
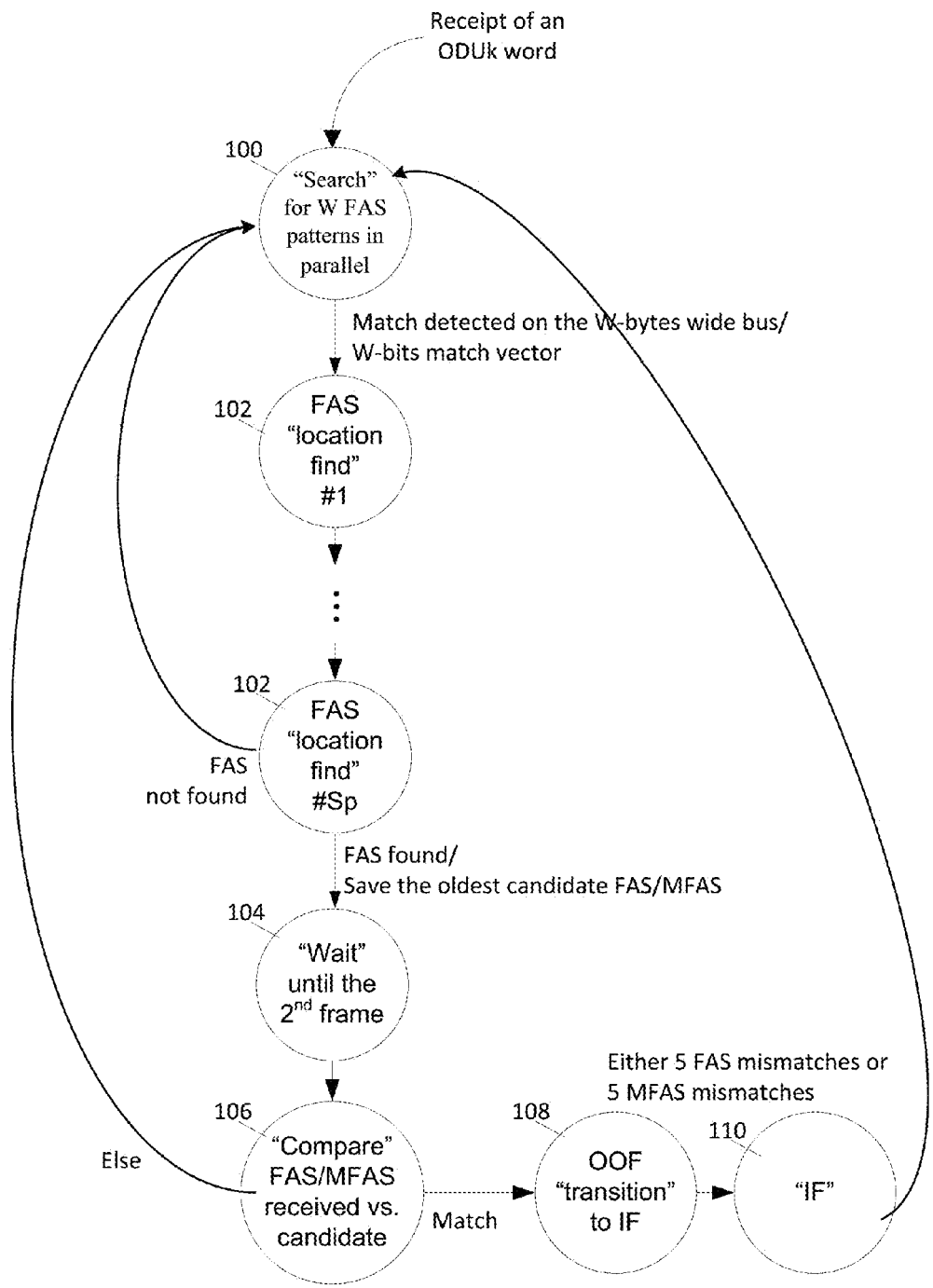
FIG. 10 shows an example of a logical sequence of states taken during frame alignment in accordance with certain embodiments of the present disclosure.

FIG. 10 shows an example of a logical sequence of states taken for frame alignment. In the FAS "search" state 100, the frame alignment logic searches for W FAS patterns in parallel and generates a match vector. In the set of FAS "location find" states 102, the controller identifies the expected locations of candidate FAS sequences over Sp number of "location find" states 102. Each of the Sp steps of FIG. 10 diagram works on one of the Sp sections as shown in FIG. 9. A single Sp section of bits is processed at once, thereby requiring a total of Sp cycles to process all groups within a single bus word.

Each FAS "location find" state 102 looks for the first FAS match within its window (section) of the match vector and passes its results to the next "location find" state 102. At the next "location find" state 102, if a previous "location find" state has found an FAS, it ignores the matches in its own window and relays the incoming result to the next "location find" state 102. As a result the multiple "location find" states 102 return the location of the first overall instance of an FAS match.

Once the potential location has been found the logic switches to a "wait" state 104 where it counts the number of bus words received in the anticipation of the second frame. This counter triggers the transition to a "compare" state 106 at the start of said second frame.

In the "compare" state 106 the FAS/MFAS patterns are matched against the expected values at the predicted start of the second frame. In case of a match, the logic moves to a "transition" state 108 where it stays until the end of the frame. Otherwise, it returns back to the "search" state 100 and starts the FAS pattern search from the beginning. Finally, the "IF" state 110 is reached by the end of the second frame.

Given a device with a bus that is W-Byte wide, the "search" state 100 of FIG. 10 produces a match vector of W-bits long. As described previously, in an embodiment of the present disclosure, during the "location find" state 102, the match vector can be split (divided) into Sp sections, with each section having a W/Sp number of bits. In this embodiment, each section of W/Sp bits is processed, one at a time, to search for the first occurrence (instance) of the FAS and MFAS within that section, to produce a partial P-bits wide location relative to a given section, where P=log(W/Sp).

The first occurrence of the FAS and MFAS sequence is the one that is closest to the most significant bit (e.g. FAS 80 in FIGS. 5 and 6). If a word has two FASs, the first FAS constitutes the first FAS. The location of the first candidate is stored in the context memory (e.g., see reference numeral 124 at FIG. 11). Once a section is processed the process repeats for the other sections until all Sp sub steps of the "location find" state 102 are covered and the first occurrence of FAS location is resolved. For example, for W=48 Bytes and Sp=4 sections, there are 12 bits searched at the same time to produce four P=4-bit wide section pointers. The section pointers are resolved into the overall (final) FAS location within the bus word.

Therefore, in this embodiment, searching the entire bus for the first FAS candidate requires multiple cycles, one for each section in order to take advantage of the large separation between the FAS bytes in the input stream. In this embodiment, the search of a partial FAS location in each of the Sp sections can be spread over up to Sp cycles, thereby reducing the number of parallel logic elements required for implementing the "location find" state 102 down to a single instance of a location find element or module. Moreover, during this process the W-bits wide match vector can be stored in a context memory and, as the "location find" steps progress through the sections, the intermediate partial P-bit wide locations can overwrite the match vector storage space for better space efficiency, as P bits is smaller than W/Sp bits shown in FIG. 9. Once an FAS has been found in a section Sp, it is not necessary to search for an FAS in the remaining sections.

By reducing the number of FAS Location Find logic elements which are active during the "location find" state 102, the area of an FAS Location Find block 114 (FIG. 11) on the die is reduced, resulting in lower cost and improved power consumption. The trade-off of improved power and area vs. increased processing cycles is acceptable because the frame length and width of the bus allow for sufficient processing time over multiple cycles. While the area savings may not be significant for small bus widths, scaling the architecture for higher throughput will result in very wide bus widths. The architecture of the present embodiment is beneficial in a wide bus implementation because the physical sizes of the FAS Location Find and compare blocks do not necessarily have to scale with the width of the bus.

Figure 11:
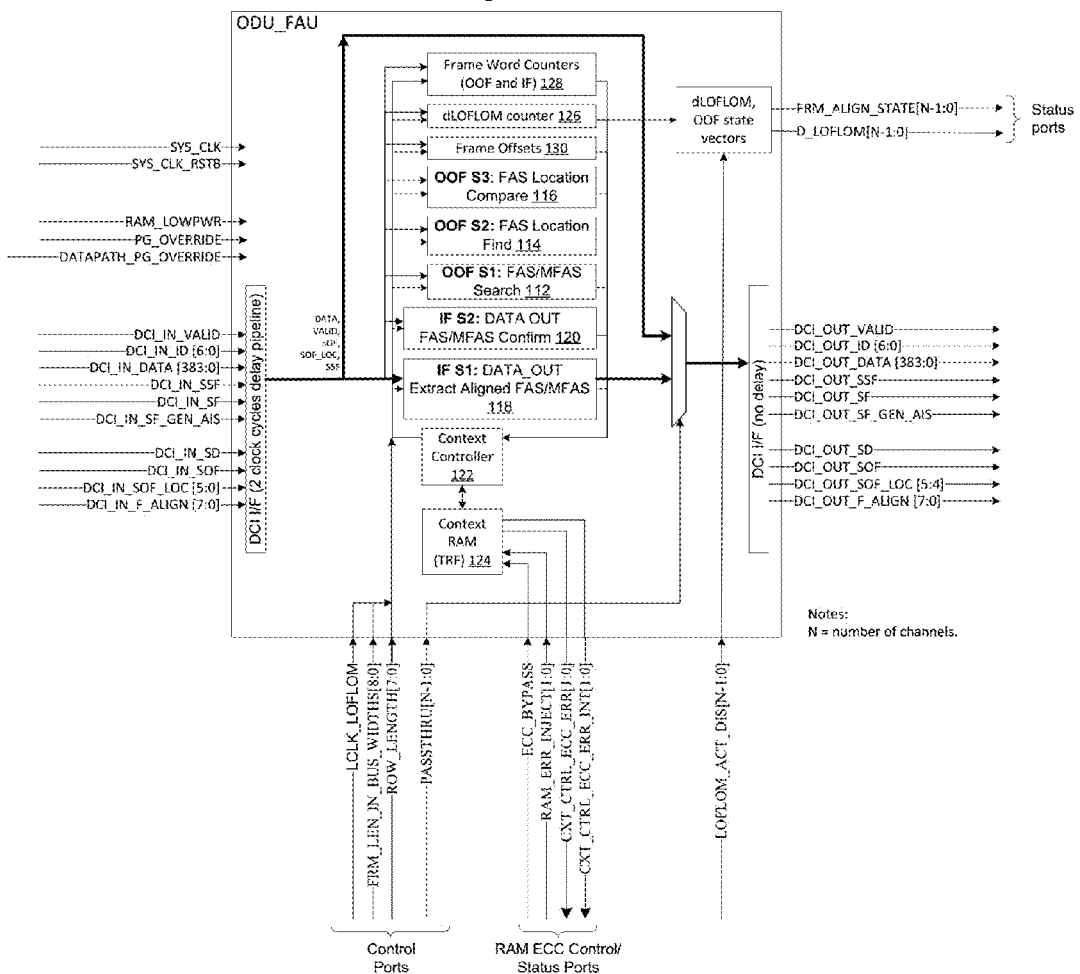
FIG. 11 shows an embodiment of a framer architecture in accordance with certain embodiments of the present disclosure.

FIG. 11 shows an embodiment of an architecture of a framer in accordance with certain embodiments of the present disclosure. The framer comprises an FAS/MFAS Search block 112, a FAS Location Find block 114, a FAS Location Compare block 116, an Extract Aligned FAS/MFAS block 118, a FAS/MFAS Confirm block 120, a Context Controller 122 and a Context RAM 124. These components can perform embodiments of the frame alignment method of the present disclosure. The FAS/MFAS Search block 112, the FAS Location Find block 114, the FAS Location Compare block 116, the Extract Aligned FAS/MFAS block 118, the FAS/MFAS Confirm block 120, the Context Controller 122 and the Context RAM 124 can be activated depending on the framing state of the logic. The framer of FIG. 11 also comprises a dLOFLOM Counter block 126, which tracks LOFLOM (Loss Of Frame and Loss Of Multiframe) standard specified defect time, a Frame Word Counter 128, which counts bus words within a frame, and finally a Frame Offset block 130, which calculates start of frame offsets within bus words. dLOFLOM stands for "defect LOFLOM".

The Extract Aligned FAS/MFAS block 118 and the FAS/MFAS Search block 112 can have their respective input conditioned by a frame offset module (not shown). The frame offset module is to adjust the location at which to search for a FAS, within a data word, after a movement of an FAS location within the data word from one frame to the next due to non-integer division of a frame length by the number of bytes per word.

The states introduced in FIG. 10 relate to the logic blocks in FIG. 11 as follows. The "search" state 100 is represented by the FAS/MFAS Search block 112. The Sp number of "location find" states 102 correspond to the by the FAS Location Find block 114. The "wait" state 104 and the "transition" state 108 correspond to the Frame Word Counter 128. The "compare" state 106 corresponds to the FAS Location Compare 116, which confirms the expected FAS/MFAS pattern and its location. A positive result indicates that the framer is frame aligned, which moves the state to "IF". A negative result restarts the FAS/MFAS pattern search from the beginning by switching to the "search" state 100.

Upon switching to the "IF" state 110, the internal Frame Word Counter locks to the newly found FAS location. At this location the data stream is checked for the consistent FAS/MFAS patterns and their offsets within the bus word until the framing is lost as defined in ITU-T Recommendation G.798. In this state the FAS/MFAS Confirm block 120 and Extract Aligned FAS/MFAS logic block 118 are active.

In another embodiment of the system of the present disclosure, the framer comprises two "in-frame" blocks for performing the steps of the "IF" state 110, as shown at FIG. 10 and FIG. 11. When the framer is aligned, the first block of the "IF" state, the block Extract Aligned FAS/MFAS 118, extracts the FAS/MFAS sequence from the expected FAS/MFAS location on the bus and stores the extracted sequence in the context memory 124. The second block of the "IF" state 110, the FAS/MFAS Confirm 120, confirms that the extracted sequence from the expected location is a FAS/MFAS sequence. The results of the FAS/MFAS Confirm state are stored in the context memory 124; five consecutive negative confirmations will cause the framer to transition to the "search" state (i.e., the out-of-frame state).

In yet another embodiment, access to the Context RAM is controlled by a Context Controller 122 (FIG. 11). The Context Controller asserts the relevant registers in the context memory depending on the current in-frame state or out-of-frame state of the framer.

In a further embodiment, the framer is a component of a multichannel time-division multiplexing ("TDM") network device and performs frame alignment for all channels on the multichannel TDM bus. It will be known to those persons skilled in art that an increase or decrease in the number of channels affects the size of the context memory and the design of the Context Controller. Consequently, it will be known to those persons skilled in the art that the methods described herein are applicable to both frame alignment of a single channel bus and frame alignment of a multichannel TDM bus.

Figure 12:
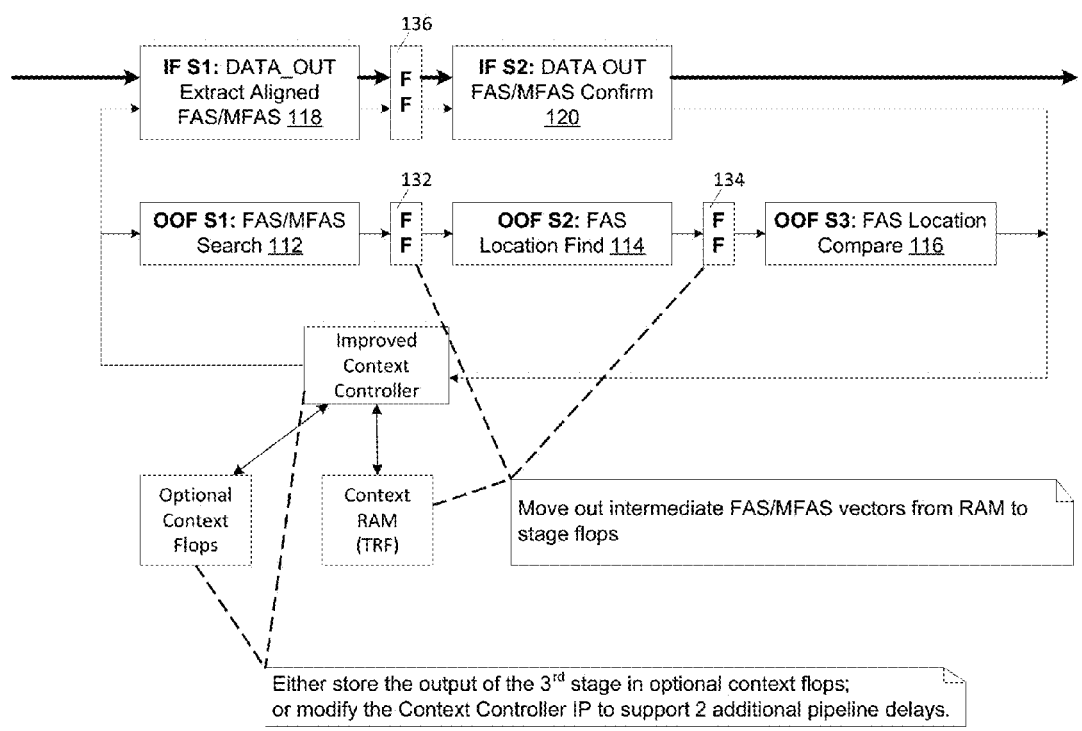
FIG. 12 shows a pipeline architecture of a framer in accordance with certain embodiments of the present disclosure.

In another embodiment, the FAS Search block, the FAS Location Find block, the FAS Location Compare block, the Extract Aligned FAS/MFAS block, and the FAS/MFAS Confirm block can be arranged in a pipeline configuration. An example of this embodiment is shown at FIG. 12. In this embodiment, certain data is temporarily written to registers in the pipeline, rather than to the Context RAM via the Context Controller. In the context of the present disclosure, an FAS search block can also be referred to as a search module; an FAS location find block can also be referred to as a location find module; and a FAS location compare block can also be referred to as a location compare module.

During the FAS search, the FAS Search block 112 generates a match vector that is loaded into a first out-of-frame pipeline register 132. When the state machine transitions to the "location find" state, the FAS Location Find block 114 reads the first out-of-frame pipeline register 132 to determine the location of the first FAS/MFAS candidate and loads the next expected FAS location into a second out-of-frame pipeline register 134. When the state machine transitions to the "compare" state, the FAS Location Compare block 116 reads next expected FAS location from the second out-of-frame pipeline register 134 in order to evaluate the validity of the expected FAS bit sequence.

Further to this embodiment, during the "IF" state, the Extract Aligned FAS/MFAS block 118 extracts bytes 3 and 4 of the 6-byte FAS from the aligned frame and loads the extracted bytes into an in-frame pipeline register 136. When the state machine transitions to the "confirm" state, the FAS/MFAS Confirm block 120 reads and evaluates the FAS data from the in-frame pipeline register 136 and increments the FAS/MFAS mismatch counter in context memory as necessary.

Figure 13:
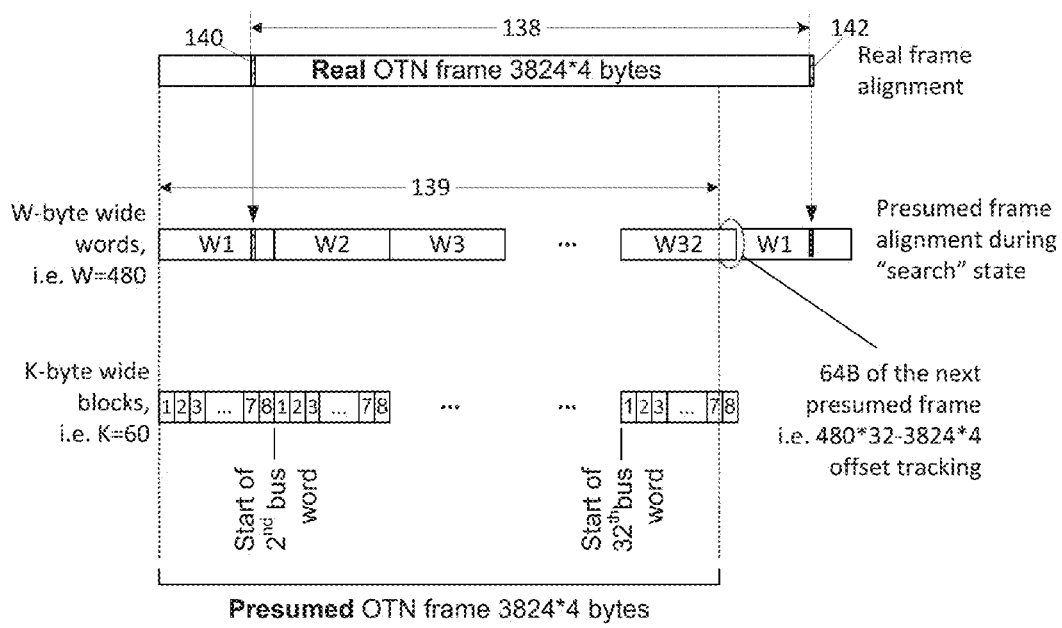
FIG. 13 shows how a presumed OTN frame can be divided into words and sections.

Another embodiment of the present disclosure aims at reducing the area and power consumption of the FAS Search block ("search" state). In this embodiment a presumed frame of OTN frame size is defined and sectioned into W-byte wide bus words. Next, each bus word is further divided into Sk number of sections each consisting of K bytes as shown in FIG. 13, where K can be chosen such that W is a multiple of K to avoid residues. FIG. 13 shows an OTN frame 138 having an FAS 140 at the first 6 bytes. An FAS 142 belongs to the next OTN frame. FIG. 13 also shows a presumed OTN frame 139 and how it is divided, in this example, into 32 W-byte wide words (W1, W2, W3, . . . W32) each having W=480 (each word has 480 bytes). Each presumed OTN frame or presumed frame can be referred to as a group of bytes that has a plurality of words; in this example, 32 words. FIG. 13 further shows how each W-byte wide word is divided, in this example, into 8 K-byte wide blocks each having K=60 (each block has 60 bytes). Any other suitable number of words per frame and blocks per word are also within the scope of the present disclosure.

In another embodiment of the present disclosure, during the FAS search, from the start of the presumed OTN frame, only the first K bytes of every bus word are searched; that is, only the first section of each word is searched. If the FAS is found, its location is saved and confirmed a frame later. If, however, the FAS pattern is not found in the first section of any of the words of the presumed OTN frame, then the search switches to the next presumed OTN frame, to the next section of each word, and so on until all sections of each word are covered. As a result, by taking a presumed frame and searching all of its sections, eventually all possible FAS locations of the real frame are covered. Thereby, the first FAS match can be found within Sk number of frames or sooner. The second match can be confirmed a frame later as by the ITU-T Recommendation G.798.

Figure 14:
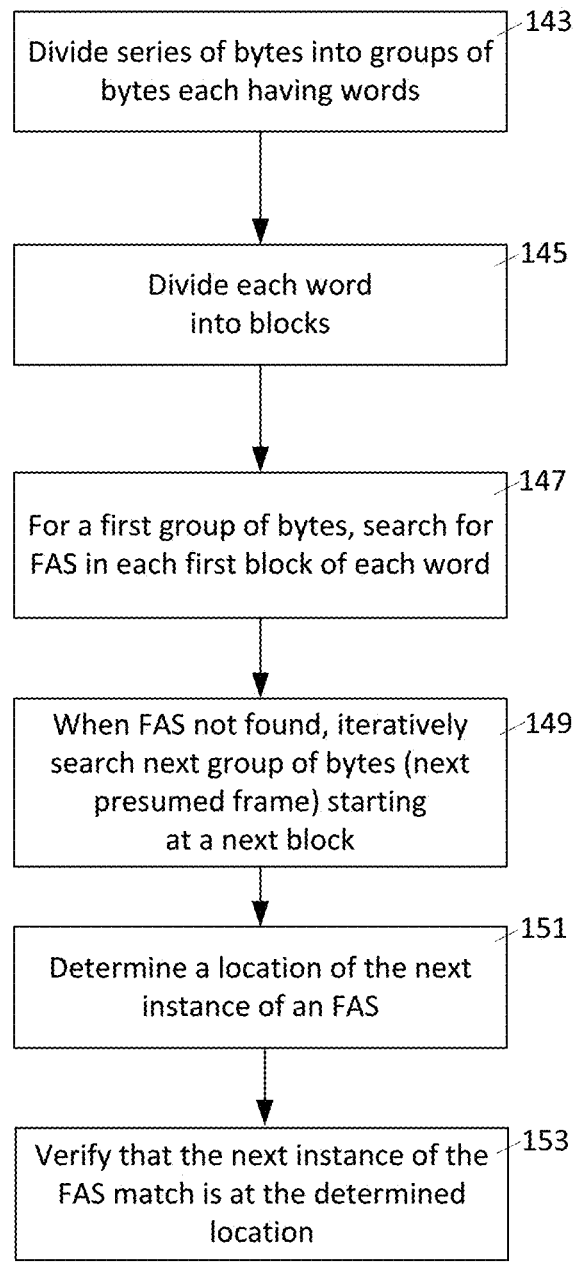
FIG. 14 shows a flowchart of a method according to another embodiment of the present disclosure.

FIG. 14 shows a flowchart of the present example of a method of framing a series of bytes that comprises an FAS, which constitutes an example of a pre-determined sequence of N consecutive alignment bytes (N being an integer). At action 143, the series of bytes is divided into multiple groups of bytes. Each group of bytes can have more bytes than a pre-determined frame length. Each group of bytes has a series of words (for example, see FIG. 13 where the series of bytes of a presumed OTN frame 139 is divided into words W1, W2, . . . , W32). At action 145, each word is divided into blocks (for example, 8 blocks per word as shown in FIG. 13). At action 147, for a first group of bytes, a search in conducted in each first block of each word. At action 149, when an FAS match is not achieved, the search iteratively continues in the next group of bytes, at the next section of every word (e.g., at section 2 of every word, then at section 3 of every word, etc. for each subsequent group of bytes), until an FAS match is found. At action 151, a determination of the location of the next instance of the FAS is made. This can be achieved by noting the start position of the FAS that was found at action 147 or action 149 and adding thereto a frame length. Subsequently, at action 153, verification is made that there is another FAS located at the location determined at action 151.

Note that each OTN frame contains 3824*4/W words, where W is the bus width in bytes and is also the length of the word in bytes. Further, Sk can be chosen similar to Sp, which described above. Sk represents the number of sections of a data bus, which will be processed over multiple frames during the "search" state by the FAS/MFAS Search logic block, while Sp is a number of sections of a data bus, which will be processed over multiple cycles of the same frame during the "location find" state by the FAS Location Find logic block. Both are used for the reduction of logic by taking advantage of available processing time.

In the conventional framer described in the background section, there are a W number of "matchers" in the FAS Search block. Each "matcher" comprises logic designed to find a 6-byte FAS sequence. The design of a 6-byte FAS matcher will be known to the person skilled in the art. Processing all of the bits of the W-Byte wide bus in parallel requires a large area and power investment in the FAS Search block.

Figure 15:
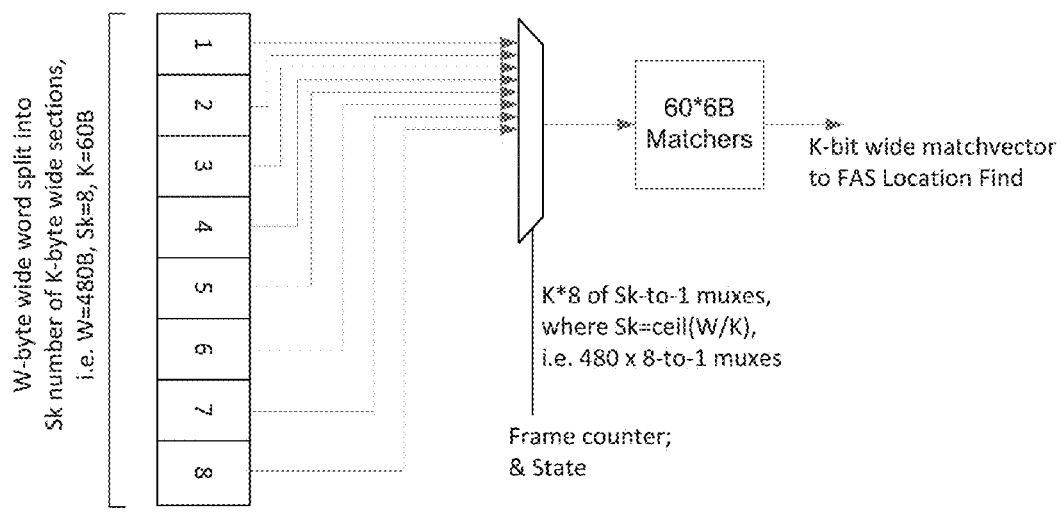
FIG. 15 shows a multiplexer having as input sections of a word.

In the present embodiment and in subsequent embodiments, the number of matchers in the FAS Search block is reduced from W to K. As a result, the FAS Search block of the present embodiment comprises K number of 6-byte matchers and K*8 number of Sk-to-1 multiplexers ("mux"), where 8 is the number of bits per byte. Each mux is chosen as an Sk-to-1 mux, where Sk is the integer number of whole or fractional blocks in the W-byte word (i.e., Sk=ceil(W/K)) as shown in FIG. 15. In FIG. 15, Sk is chosen to be eight.

As shown in FIG. 15, a mux 200 has inputs 1 through Sk that correlate to the blocks 1 through Sk. Thus, when searching for FAS the muxes initially will load each bit of the first block into the K number of 6-byte matchers. If a match is not found over the expected frame length, the muxes switch to the next word block of the second frame, and the search in performed within that block for every word (every W-byte wide bus word) of the second frame. The process repeats until all blocks are covered over Sk frames, after which the mux rolls over back to the first block but for the $(Sk+1)^{th}$ frame. In the present example, there are 32 words, each having 480 bytes, and each word is divided into 8 blocks. As such, the total number of bytes contained in those 32 words exceeds the number of bytes in an OTN frame by 64 bytes (32*480 bytes−15296 bytes=64 bytes), which can be referred to as a 64 byte offset. Consequently, as an example, because of this 64 byte offset, if there is an FAS located starting at byte 300 in the first word of a presumed frame, then another instance of an FAS should be located starting at byte 236 (300−64) of the first word of the next presumed frame, and starting at byte 172 (300−64*2) of the first word of the presumed frame after that. The movement of the FAS position from frame to frame can be referred to as a frame rotation or rotation of the frame. As will be described further below, it is possible to take the advantage of the rotation of the frame within the data bus from frame to frame, which will be described further below.

As stated above, the fact that, in the present example, there are 32 words, each having 480 bytes, and each word is divided into 8 blocks. This results in a 64 byte offset. However, this need not be the case. For example, if each word has 478 bytes, there would be exactly 32 words per frame and there would be no byte offset of any kind.

Figure 16:
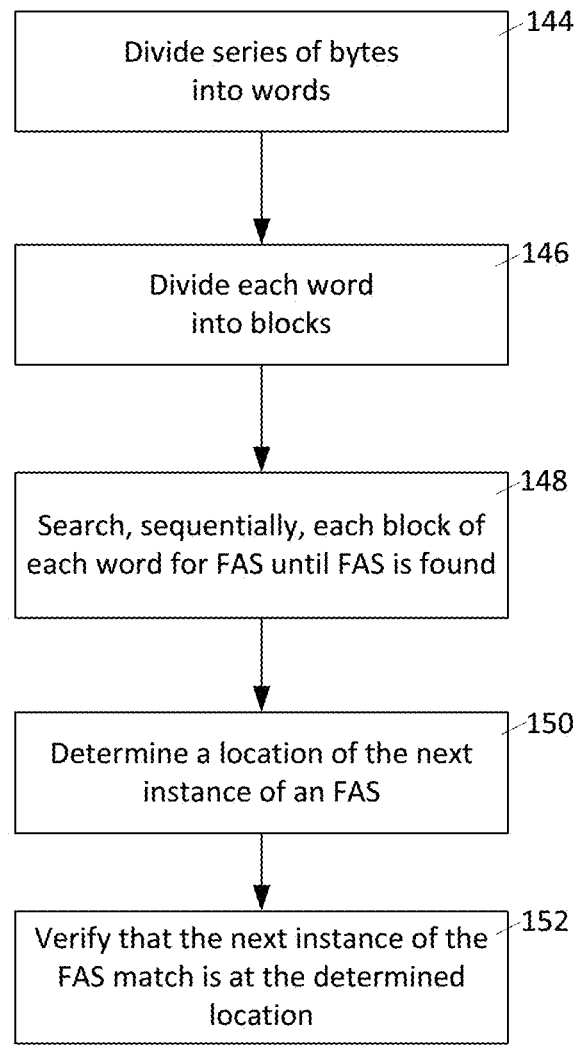
FIG. 16 shows a flowchart of a method according to another embodiment of the present disclosure.

FIG. 16 shows a flowchart of an example of a method of framing a series of bytes that comprises an FAS, which constitutes an example of a pre-determined sequence of N consecutive alignment bytes (N being an integer). At action 144, the series of bytes is divided into a series of words (for example, see FIG. 13 where the series of bytes a presumed OTN frame 139 is divided into words W1, W2, . . . , W32). At action 146, each word is divided into blocks (for example, 8 blocks per word as shown in FIG. 13). At action 148, starting at a first block of a first word, each block of each word is searched to find an FAS. Action 148 ends upon finding an FAS. At action 150, a determination of the location of the next instance of the FAS is made. This can be achieved by noting the start position of the FAS that was found at action 148 and adding thereto a frame length. Subsequently, at action 152, verification is made that there is another FAS located at the location determined at action 150.

As mentioned above, depending on the bus width (W) and the selected block size (K), the FAS pattern will move within the bus word frame after frame. For example, in the case of W=480 the start of frame will move by an offset M=480*32 −3824*4=64 bytes as shown in FIG. 13. Such a frame rotation can be beneficial for searching for the initial FAS pattern in the "search" state.

For example, a search for an FAS can be conducted by searching only the first block of every word for an entire frame length. If a match is not found over the frame length, the process can be repeated on the next frame by looking at the same block by taking advantage of the discussed frame rotation. Eventually the FAS pattern will appear in first block. Note that if K is smaller than M, the FAS might skip the search window while rotating. This can happen multiple times until eventually a successful rotation. Thus, to minimize the first FAS finding time, the K and M values can be carefully selected, for example, by having K≥M.

Figure 17:
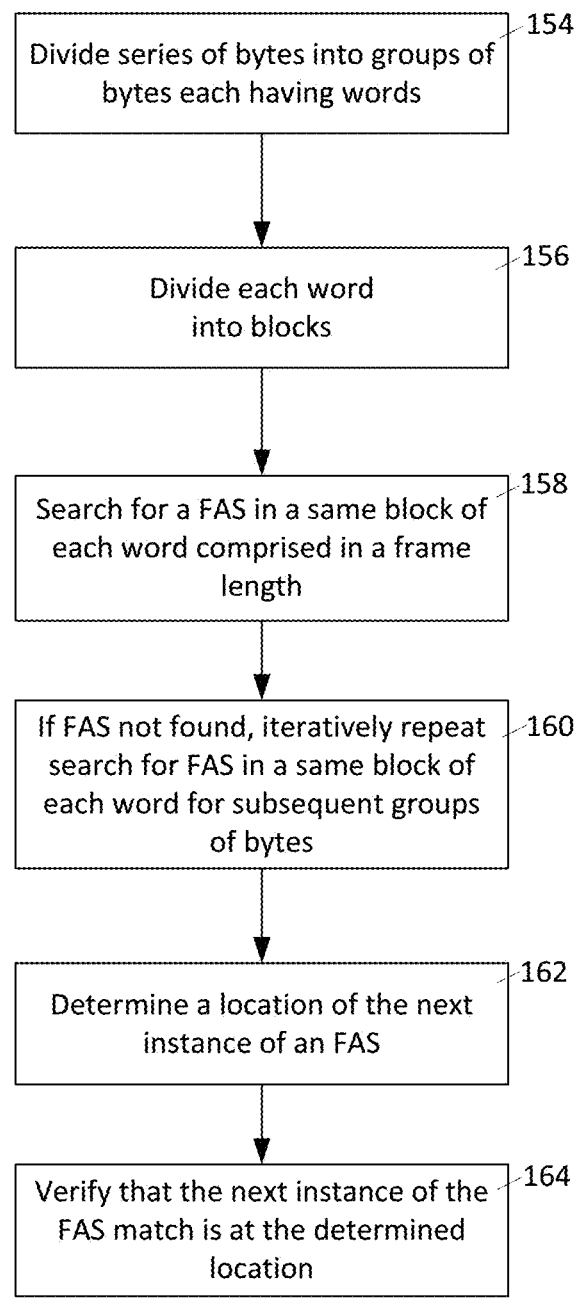
FIG. 17 shows a flowchart of a method according to another embodiment of the present disclosure.

FIG. 17 shows a flowchart of an embodiment of the present disclosure. At action 154, the series of bytes is divided into multiple groups of bytes. Each group of bytes can have more bytes than a pre-determined frame length. Each group of bytes has a series of words (for example, see FIG. 13 where the series of bytes of a presumed OTN frame 139 is divided into words W1, W2, . . . , W32). At action 156, each word is divided into blocks (for example, 8 blocks per word as shown in FIG. 13). At action 158, the search for an FAS is conducted in a same block of each word comprised in a frame length. For example, referring now to FIG. 13, the search for the FAS is conducted in the first block of each of the 32 words of FIG. 13. At action 156, each word is divided into blocks (for example, 8 blocks per word as shown in FIG. 13). At action 158, for a first group of bytes, a search in conducted in each first block of each word. At action 160, when an FAS match is not achieved, the search iteratively continues in the next group of bytes, at the first block of every word, until an FAS match is found. At action 162, a determination of the location of the next instance of the FAS is made. This can be achieved by noting the start position of the FAS that was found at action 158 or action 160 and adding thereto a frame length. Subsequently, at action 164, verification is made that there is another FAS located at the location determined at action 162.

In some of the embodiments presented above, after the selection of Sk search blocks, the matchers in the FAS Search block return a K-bit long match vector. When at least one FAS candidate is found, which is indicated by a non-zero match vector, the latter is stored in the context memory for further processing in the "location find" and "compare" states by the FAS Location Find and FAS Location Compare blocks respectively. After moving to the in-frame ("IF") state the muxes keep selecting from the same block until the alignment is lost.

In some of the embodiments presented above, the area of the FAS Search block on the die is reduced, resulting in improved power consumption. The trade-off of improved power and area vs. increased processing cycles is acceptable because the frame length and width of the bus allow for sufficient processing time over multiple cycles. While the area savings may not be significant for small bus widths, scaling the architecture for higher throughput will result in very wide bus widths. The architecture of the present embodiment is beneficial in a wide bus implementation because the physical size of the FAS Search block does not necessarily have to scale with the width of the bus.

The embodiments described in the present disclosure are explained using byte aligned bus words. However, it should be apparent to one skilled in the art that it could be also applied to bit and other alignments. Furthermore, the present disclosure uses an example of ODUk frame alignment. However, it should be also apparent to one skilled in the art that the same method and system is suitable for OTUk frame alignment.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Further, even though examples of the present disclosure relate to aligning a series of bytes comprising a plurality of instances of a pre-determined sequence of N consecutive alignment bytes, the pre-determined sequence of N consecutive alignment bytes being a frame alignment signal (FAS), the scope of the present disclosure also applies not only to aligning a series of bytes but also to aligning a series of any suitable type of data units. Such data units can include bits, bytes, and any suitable combination thereof. As such, the present disclosure also relates to aligning a series of data units comprising a plurality of instances of a pre-determined sequence of N consecutive alignment data units. Further, even though examples of the present disclosure relate to OTUk and ODUk frame alignment, the scope of the present disclosure also applies to any other suitable types of frames.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

The invention claimed is:

1. A method of aligning a series of bytes comprising a plurality of instances of a pre-determined sequence of N consecutive alignment bytes, N being an integer number, the pre-determined sequence of N consecutive alignment bytes being a frame alignment signal (FAS), the method comprising:
   comparing the series of bytes to the FAS to identify locations of FASs within the series of bytes;
   generating a match vector in accordance with the locations of the FASs, the match vector having components indicative of the location of an FAS match, the components having a FAS match value;
   dividing the match vector into sections;
   searching, in the sections, in one section at a time, for a first instance of an FAS match value;
   determining, in accordance with a pre-determined frame length and in accordance with a position of the first instance of the FAS match value within the match vector, a location of a next expected instance of the FAS; and
   verifying that the location of the next expected instance of the FAS match value has an FAS match value.

2. The method of claim 1 wherein:
   comparing the series of bytes includes, for each sequence of N consecutive bytes comprised in the series of bytes, comparing the consecutive sequence of N bytes to the FAS; and
   generating the match vector includes:
     generating a component that has an FAS match value when the consecutive sequence of N bytes matches the FAS; and
     generating a component that has a no-match value when the consecutive sequence of N bytes does not match the FAS.

3. The method of claim 2 wherein any two consecutive sequences of N consecutive bytes are offset by one byte.

4. The method of claim 1 wherein the series of bytes comprises multiple ODUk frames.

5. The method of claim 4 wherein the FAS comprises six bytes.

6. The method of claim 4 wherein the series of bytes further comprises a plurality of one byte, multi-frame alignment signals (MFASs), each MFASs defining a number, the method further comprising:
   verifying that consecutive MFASs define consecutive numbers.

7. The method of claim 4 wherein the pre-determined frame length is an ODUk frame length.

8. The method of claim 1 wherein the series of bytes comprises multiple OTUk frames.

9. The method of claim 8 wherein the FAS comprises four bytes.

10. The method of claim 8 wherein the series of bytes further comprises a plurality of one byte, multi-frame alignment signals (MFASs), each MFASs defining a number, the method further comprising:
    verifying that consecutive MFASs define consecutive numbers.

11. The method of claim 8 wherein the pre-determined frame length is an OTUk frame length.

12. A non-transitory, tangible computer-readable medium having instructions recorded thereon to be performed by a processor to carry out a method as defined in claim 1.

13. A method of aligning a series of bytes comprising a plurality of instances of a pre-determined sequence of N consecutive alignment bytes, N being an integer number, the pre-determined sequence of N consecutive alignment bytes being a frame alignment signal (FAS), the method comprising:

dividing the series of bytes into multiple groups of bytes, each group having a number of words (NW), each group of bytes having a total number of bytes equal to, or greater than, a predetermined frame length;

dividing each word into blocks;

starting at a first block of a first word, comparing, sequentially for each word, the consecutive sequences of N bytes of the first block with the FAS;

when a match is not found between any sequence of N bytes and the FAS, iteratively performing the following action:

A. starting at a start block of a first word of the subsequent group of bytes, comparing, sequentially for each word, the consecutive sequences of N bytes of the start block with the FAS, each start block being located NW words and one block away from a respective first block when performing action A for the first time, or from a respective previous start block when performing action A for the second time or more;

when the match is found between a sequence of N bytes and the FAS, comparing another sequence of N bytes located one pre-determined frame length away from the sequence of N bytes that matches the FAS with the FAS to confirm that the other sequence of N bytes also matches with the FAS.

14. The method of claim 13 wherein any two consecutive sequences of N consecutive bytes are offset by one byte.

15. The method of claim 13 wherein the series of bytes comprises multiple ODUk frames.

16. The method of claim 15 wherein the FAS comprises six bytes.

17. The method of claim 15 wherein the series of bytes further comprises a plurality of one byte, multi-frame alignment signals (MFASs), each MFASs defining a number, the method further comprising:

verifying that consecutive MFASs define consecutive numbers.

18. The method of claim 15 wherein the pre-determined frame length is an ODUk frame length.

19. The method of claim 13 wherein the series of bytes comprises multiple OTUk frames.

20. The method of claim 19 wherein the FAS comprises four bytes.

21. The method of claim 19 wherein the series of bytes further comprises a plurality of one byte, multi-frame alignment signals (MFASs), each MFASs defining a number, the method further comprising:

verifying that consecutive MFASs define consecutive numbers.

22. The method of claim 19 wherein the pre-determined frame length is an OTUk frame length.

23. A non-transitory, tangible computer-readable medium having instructions recorded thereon to be performed by a processor to carry out a method as defined in claim 13.

24. A method of aligning a series of bytes comprising a plurality of instances of a pre-determined sequence of N consecutive alignment bytes, N being an integer number, the pre-determined sequence of N consecutive alignment bytes being a frame alignment signal (FAS), the method comprising:

dividing the series of bytes in a number of words NW;

dividing each word into blocks;

starting at a first block of a start word, comparing, sequentially for each block of each word, until a match is found between a sequence of N bytes of the byte segment and the FAS, the consecutive sequences of N bytes of the block with the FAS; and when the match is found between a sequence of N bytes and the FAS, comparing another sequence of N bytes located one pre-determined frame length away from the sequence of N bytes that matches the FAS with the FAS to confirm that the other sequence of N bytes also matches with the FAS.

25. The method of claim 24 wherein any two consecutive sequences of N consecutive bytes are offset by one byte.

26. The method of claim 24 wherein the series of bytes comprises multiple ODUk frames.

27. The method of claim 26 wherein the FAS comprises six bytes.

28. The method of claim 26 wherein the series of bytes further comprises a plurality of one byte, multi-frame alignment signals (MFASs), each MFASs defining a number, the method further comprising:

verifying that consecutive MFASs define consecutive numbers.

29. The method of claim 26 wherein the pre-determined frame length is an ODUk frame length.

30. The method of claim 24 wherein the series of bytes comprises multiple OTUk frames.

31. The method of claim 30 wherein the FAS comprises four bytes.

32. The method of claim 30 wherein the series of bytes further comprises a plurality of one byte, multi-frame alignment signals (MFASs), each MFASs defining a number, the method further comprising:

verifying that consecutive MFASs define consecutive numbers.

33. The method of claim 30 wherein the pre-determined frame length is an OTUk frame length.

34. A non-transitory, tangible computer-readable medium having instructions recorded thereon to be performed by a processor to carry out a method as defined in claim 24.

35. A method of aligning a series of bytes comprising a plurality of instances of a pre-determined sequence of N consecutive alignment bytes, N being an integer number, the pre-determined sequence of N consecutive alignment bytes being a frame alignment signal (FAS), the method comprising:

dividing the series of bytes into multiple groups of bytes, each group having a number of words NW, each word having a word length, a pre-determined frame length not being an integer multiple of the word length;

dividing each word into blocks, each block having a number of bytes (NB), a total number of bytes in each word being an integer multiple of NB, the total number of bytes NB in each block having a plurality of consecutive sequences of N bytes;

comparing, for a first block of each word of a first group of bytes, the consecutive sequences of N bytes of the first block with the FAS;

when a match is not found between any sequence of N bytes and the FAS, iteratively performing the following action until a match is found between a sequence of N bytes of the byte segment and the FAS:

for each word of the subsequent group of bytes, comparing, for each of the first blocks, the consecutive sequences of N bytes of each the first block with the FAS;

when the match is found between a sequence of N bytes and the FAS, comparing another sequence of N bytes located one pre-determined frame length away from the sequence of N bytes that matches the FAS with the FAS to confirm that the other sequence of N bytes also matches with the FAS.

36. The method of claim 35 wherein any two consecutive sequences of N consecutive bytes are offset by one byte.

37. The method of claim 35 wherein the series of bytes comprises multiple ODUk frames.

38. The method of claim 35 wherein the FAS comprises six bytes.

39. The method of claim 35 wherein the series of bytes further comprises a plurality of one byte, multi-frame alignment signals (MFASs), each MFASs defining a number, the method further comprising:
verifying that consecutive MFASs define consecutive numbers.

40. The method of claim 35 wherein the pre-determined frame length is an ODUk frame length.

41. The method of claim 35 wherein the series of bytes comprises multiple OTUk frames.

42. The method of claim 41 wherein the FAS comprises four bytes.

43. The method of claim 41 wherein the series of bytes further comprises a plurality of one byte, multi-frame alignment signals (MFASs), each MFASs defining a number, the method further comprising:
verifying that consecutive MFASs define consecutive numbers.

44. The method of claim 41 wherein the pre-determined frame length is an OTUk frame length.

45. A non-transitory, tangible computer-readable medium having instructions recorded thereon to be performed by a processor to carry out a method as defined in claim 35.

46. A system for aligning a series of bytes comprising a plurality of instances of a pre-determined sequence of N consecutive alignment bytes, N being an integer number, the pre-determined sequence of N consecutive alignment bytes being a frame alignment signal (FAS), the system comprising:
a search module to search for instances of the pre-determined sequence of N consecutive alignment bytes, within the series of bytes, by comparing the series of bytes to the FAS, to identify locations of FASs within the series of bytes, the search module also to generate a match vector in accordance with the locations of the FASs, the match vector having components indicative of the location of an FAS match, the components having a FAS match value;
a memory to store the match vector;
a location find module to retrieve, sequentially, from the memory, sections of the match vector to search the sections for FAS matches and to identify a position of a first instance of an FAS match value, the location find module also to store, in the memory, the position of the first instance of an FAS match value;
a location compare module to retrieve, from the memory the position of the first instance of an FAS match value and to determine, in accordance with a pre-determined frame length and in accordance with a position of the first instance of the FAS match value, a location of a next expected instance of the FAS;
an extraction module to extract a byte sequence from the location of the next expected instance of the FAS, as determined by the location compare module; and,
a confirm module to compare the extracted byte with the FAS and to indicate a FAS match or no FAS match.

47. The system of claim 46, further comprising:
a frame offset module to adjust the location at which to search for a FAS, within a data word, after a movement of an FAS location within the data word from one frame to the next due to non-integer division of a frame length by the number of bytes per word; and
a first word counter module to count a number of words between a FAS in one frame and a FAS in another frame, the first word counter being enabled concurrently with an out of frame (OOF) state; and
a second word counter module to keeping track of an assumed correct FAS alignment during the OOF and during the in-frame states.

48. A system for aligning a series of bytes comprising a plurality of instances of a pre-determined sequence of N consecutive alignment bytes, N being an integer number, the pre-determined sequence of N consecutive alignment bytes being a frame alignment signal (FAS), the system comprising:
a search module to search for instances of the pre-determined sequence of N consecutive alignment bytes, within the series of bytes, by comparing the series of bytes to the FAS, to identify locations of FASs within the series of bytes, the search module also to generate a match vector in accordance with the locations of the FASs, the match vector having components indicative of the location of an FAS match, the components having a FAS match value;
a first register serially connected to the search module, the register to store the match vector;
a location find module serially connected to the first register;
a second register serially connected to the location find module, the location find module to retrieve, from the first register, sections of the match vector to search the sections for FAS matches and to identify a position of a first instance of an FAS match value, the location find module also to store, in the second register, the position of the first instance of an FAS match value;
a location compare module to retrieve, from the second register, the position of the first instance of an FAS match value and to determine, in accordance with a pre-determined frame length and in accordance with a position of the first instance of the FAS match value, a location of a next expected instance of the FAS;
an extraction module to extract a FAS from the incoming data stream at an expected FAS location;
a third register serially connected to the extraction module, the register to store the byte sequence extracted by the extraction module;
a confirm module serially connected to the third register, the confirm module to compare the extracted byte with the FAS and to indicate a FAS match or no FAS match; and
a frame offset module connected at an input of the extraction module and at the input of the search module, the frame offset module to adjust the location at which to search for a FAS, within a data word, after a movement of an FAS location within the data word from one frame to the next due to non-integer division of a frame length by the number of bytes per word.

* * * * *